United States Patent [19]

Tanaka

[11] Patent Number: 5,339,703
[45] Date of Patent: Aug. 23, 1994

[54] TRANSMISSION FOR A VEHICLE

[75] Inventor: Tomio Tanaka, Osaka, Japan

[73] Assignee: Kubota Corporation, Osaka, Japan

[21] Appl. No.: 33,535

[22] Filed: Feb. 22, 1993

Related U.S. Application Data

[63] Continuation of Ser. No. 824,710, Jan. 21, 1992, which is a continuation of Ser. No. 563,429, Aug. 7, 1990, abandoned.

[30] Foreign Application Priority Data

Feb. 7, 1990 [JP]  Japan .................................. 2-27546
Feb. 7, 1990 [JP]  Japan .................................. 2-27547

[51] Int. Cl.⁵ .............................................. F16H 37/00
[52] U.S. Cl. .................................... 74/15.4; 74/15.66; 192/3.62
[58] Field of Search .............. 74/15.4, 15.66, 15.8, 74/15.56, 15.88; 142/3.62

[56] References Cited

U.S. PATENT DOCUMENTS

| | | | |
|---|---|---|---|
| 1,207,951 | 12/1916 | Loomis | 74/15.66 X |
| 1,749,828 | 3/1930 | Maier | 74/15.86 |
| 1,876,561 | 9/1932 | Brown | 74/15.4 X |
| 2,214,805 | 9/1940 | Baker et al. | 74/15.86 X |
| 2,311,265 | 2/1943 | Stumpf | 74/15.86 X |
| 2,847,871 | 8/1958 | Schick | 192/3.62 X |
| 3,065,643 | 11/1962 | Mark et al. | 74/15.4 X |
| 3,733,912 | 5/1973 | Murayama et al. | 74/15.4 |
| 4,141,424 | 2/1979 | Murayama et al. | 74/15.4 X |
| 4,565,102 | 1/1986 | Miyahara et al. | 74/15.86 X |
| 4,610,174 | 9/1986 | Takagi et al. | 74/15.4 X |
| 4,716,775 | 1/1988 | Horii et al. | 74/15.4 X |
| 4,824,128 | 4/1989 | Takagi et al. | 180/53.1 |
| 4,856,355 | 8/1989 | Ishimara | 74/15.4 X |

FOREIGN PATENT DOCUMENTS

| | | |
|---|---|---|
| 63-26 | 5/1988 | Japan . |
| 1602884 | 4/1978 | United Kingdom . |
| 2027501 | 2/1980 | United Kingdom ............... 74/15.86 |
| 2028935 | 3/1980 | United Kingdom . |
| 2206852 | 1/1989 | United Kingdom . |

Primary Examiner—Allan D. Herrmann
Assistant Examiner—David W. Laub
Attorney, Agent, or Firm—Gifford, Groh, Sprinkle, Patmore and Anderson

[57] ABSTRACT

A transmission for a working vehicle comprises a transmission case disposed between an engine and rear wheels, the transmission case housing, in a forward portion thereof, an input main shaft, a propelling transmission shaft and a PTO transmission shaft extending parallel to one another in the fore and aft direction. The two transmission shafts are arranged at laterally opposite sides of the input main shaft. A propelling change speed gearing is mounted on and between the input main shaft and propelling transmission shaft. A PTO change speed gearing is mounted on and between the input main shaft and PTO transmission shaft. These change speed gearings are operable by change speed levers extending upwardly from a clutch case interposed between the engine and transmission case.

5 Claims, 7 Drawing Sheets

TRANSMISSION FOR A VEHICLE

This is a continuation of copending application Ser. No. 07/824,710 filed on Jan. 21, 1992 which is a continuation of Ser. No. 07/563,429 filed on Aug. 7, 1990, and is now abandoned.

BACKGROUND OF THE INVENTION

(1) Field of the Invention

The present invention relates to a transmission for a tractor having a transmission case supporting rear axles and directly coupled to an engine.

(2) Prior Art

A conventional transmission having a change speed gearing of a propelling system and a change speed gearing of a PTO system is disclosed in Japanese Utility Model Publication Kokai No. 63-26. In this known construction, transmission shafts forming part of the two change speed gearings, respectively, are juxtaposed vertically. Consequently, the transmission case has large vertical dimensions.

Where, as in the known construction, the transmission shafts forming part of the two change speed gearings are juxtaposed vertically, the transmission case has large vertical dimensions. Thus, in the case of a tractor with a transmission case acting also as a tractor frame, a step board placed on top of the transmission case has a center portion thereof bulging upward to a large extent. In this way the step board is clearly separated right and left, leaving narrow spaces for the driver's foot rests. When boarding or alighting from the tractor, the driver would find the bulging portion obstructive and could have his foot caught by that portion. In this sense, there is room for improvement from the point of view of comfort on the step board.

U.S. Pat. No. 4,824,128 discloses a transmission in which a change speed mechanism of a propelling system and a change speed mechanism of a PTO system are arranged at opposite sides of a longitudinal centerline of the transmission. This construction has a disadvantage that the transmission still has a considerably large sectional area.

SUMMARY OF THE INVENTION

An object of the present invention is to provide a transmission in which a change speed gearing of a propelling system and a change speed gearing of a PTO system are arranged in a way to allow the transmission case to have small vertical dimension and a minimal sectional area, thereby to provide an improvement with respect to the inconveniences noted above.

The above object is achieved, according to the present invention, by a transmission for a vehicle for transmitting power of an engine to rear wheels, comprising a transmission case disposed between the engine and rear wheels, an input main shaft mounted in a forward portion of the transmission case and extending in a fore and aft direction for receiving the power of the engine, a propelling transmission shaft disposed at one side of and extending parallel to the input main shaft, a PTO transmission shaft disposed at the other side of and extending parallel to the input main shaft, a propelling change speed gearing mounted on and between the input main shaft and propelling transmission shaft, a PTO change speed gearing mounted on and between the input main shaft and PTO transmission shaft, and a change speed control device for operating the propelling change speed gearing and/or the PTO change speed gearing.

In the above construction, the change speed gearings of the propelling and PTO systems are arranged side by side with the input main shaft in between inside the forward portion of the transmission case on which the step board is placed. This allows the forward portion of the transmission case to have a transversely large flat sectional shape and a small sectional area compared with the known construction.

In this way, the forward portion of the transmission case has a reduced height which is achieved by the unique arrangement of the change speed gearings and transmission shafts of the propelling and PTO systems. This realizes a step board having a reduced upward bulge around its center, to flatten the step board as much as possible. As a result, an increased area is secured for the drive to rest his feet, which means an improvement for his comfort.

The reduced upward bulge around the center of the step board minimizes the possibility of the driver having his foot caught by the bulge in boarding or alighting from the vehicle.

In order to promote the reduction in the sectional area of the transmission case, the present invention proposes a construction in which the propelling change speed gearing includes a first set of propelling gears mounted on the input main shaft and a second set of propelling gears mounted on the propelling transmission shaft, and the PTO change speed gearing includes a first set of PTO gears mounted on the input main shaft and a second set of PTO gears mounted on the PTO transmission shaft. In this construction, at least part of the first set of propelling gears and the first set of PTO gears are shared by the propelling change speed gearing and the PTO change speed gearing.

Further, in a preferred embodiment of the invention in which a clutch case is connected to a vertical wall of the transmission case opposed to the engine, an attempt is made to improve the inconvenience in comfort due to the present of a change speed lever or levers. In this embodiment, the change speed control device includes shifter control rods extending through the vertical wall into the clutch case, and a change speed lever extends upwardly from an upper surface of the clutch case for pushing and pulling the shifter control rods. This improvement is made in view of the fact that a tractor generally has a clutch case extending rearwardly from the main portion of the engine.

More particularly, the change speed gearings have control rods extending in the fore and aft direction, and it is therefore possible to extend the forward ends of the rods through the partition wall into the clutch case. This allows the change speed lever for pushing and pulling the control rods to extend upwardly from the upper surface of the clutch case.

According to the present invention, the change speed lever is relocated forwardly from an upper position of the forward portion of the transmission case as in the prior art to an upper position of the clutch case. Since the change speed lever is now located further forwardly of the step board and away from the driver's toes, the driver may board and alight from the vehicle with hardly any obstruction and enjoy greater comfort on the step board.

Other features and advantages of the present invention may be apparent from the following description.

BRIEF DESCRIPTION OF THE DRAWINGS

The drawings show a transmission for a tractor according to the present invention, in which.

DESCRIPTION OF THE PREFERRED EMBODIMENT

An embodiment of the present invention will be described hereinafter with reference to the drawings.

Figure 1:
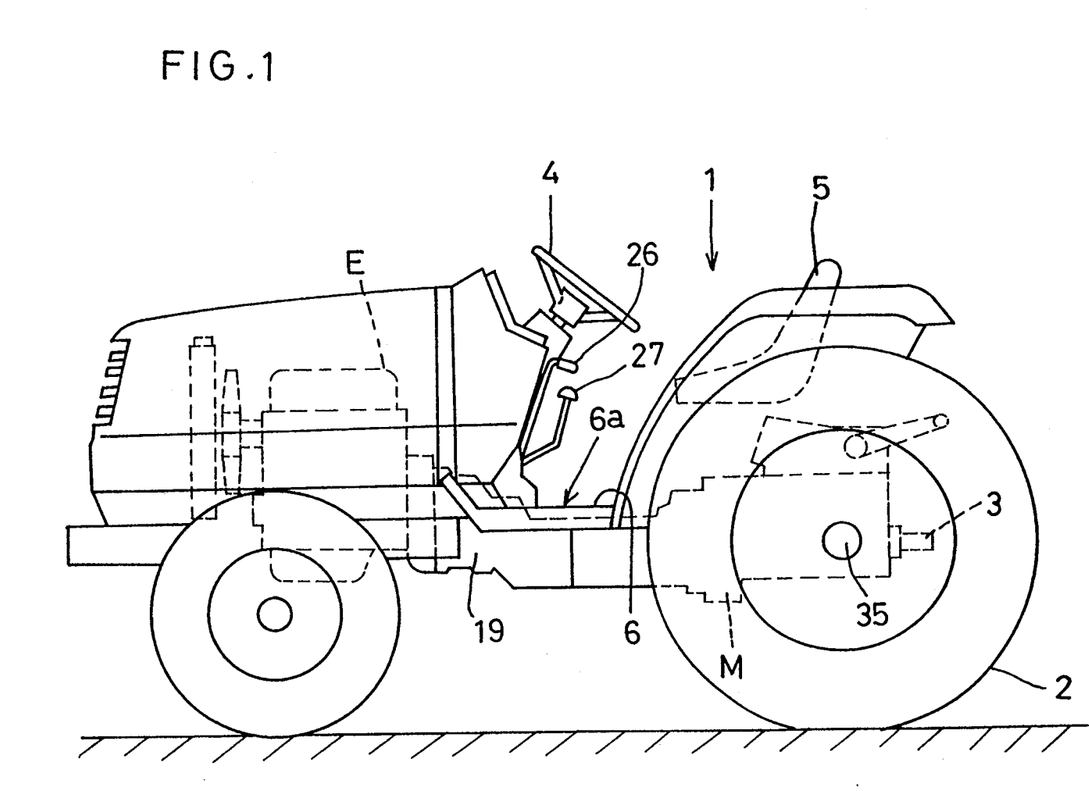
FIG. 1 is a side elevation of the tractor.

FIG. 1 shows an agricultural tractor. This tractor comprises an engine E mounted on a front position of a vehicle body, and a driver's section 1 provided centrally of the vehicle body. A transmission case M extends longitudinally of the vehicle body and acts also as a body frame. The transmission case N is directly coupled to the engine E for transmitting power of the engine E to rear wheels 2 and a PTO shaft 3.

The driver's section 1 includes a steering wheel 4, a driver's seat 5 and a step board 6. The transmission case M is located under a transversely intermediate position of the step board 6.

Figure 2A:
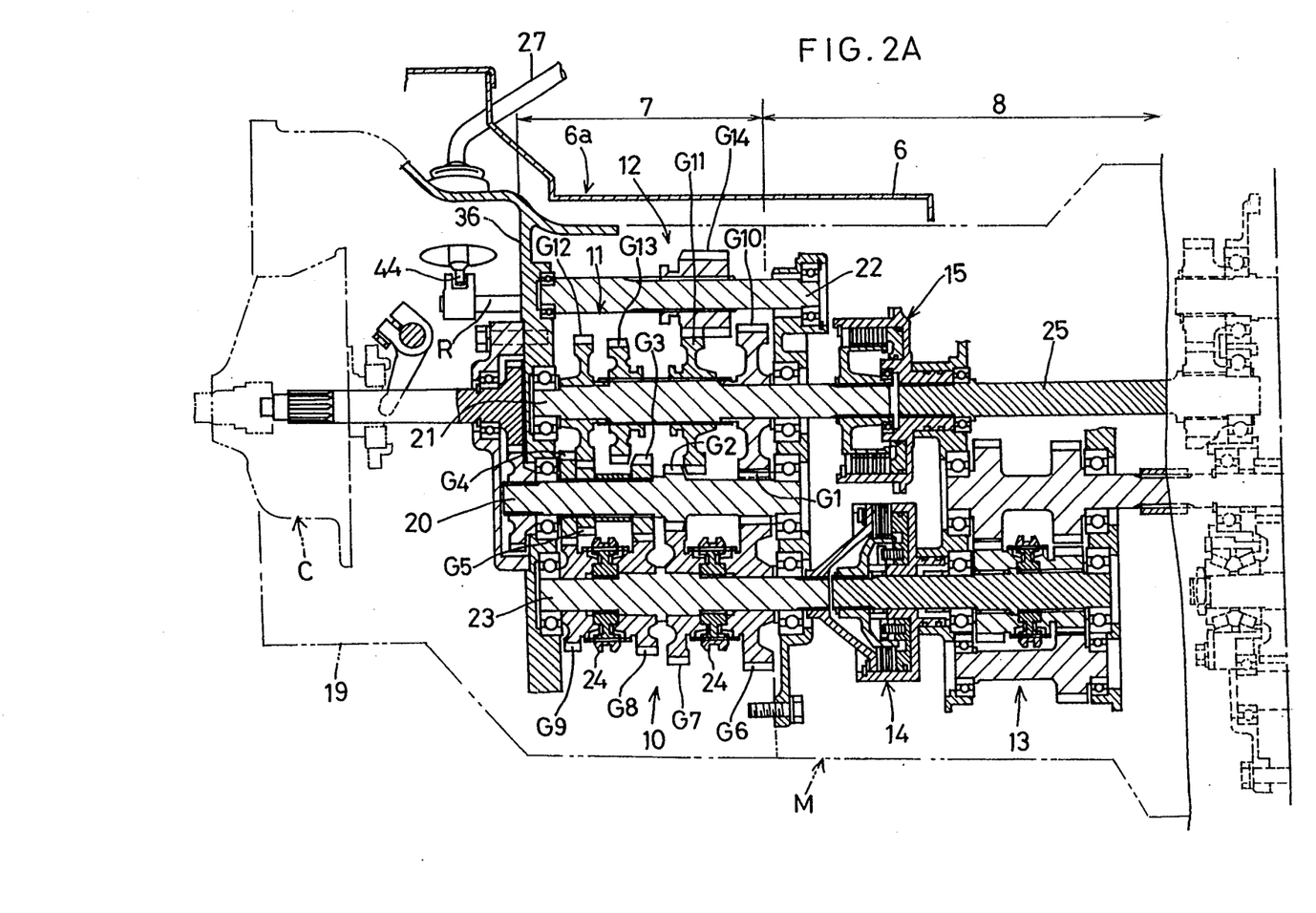
FIG. 2a is a top view of the transmission taken at an angle approximately forty-five degrees from the horizontal.
Figure 2B:
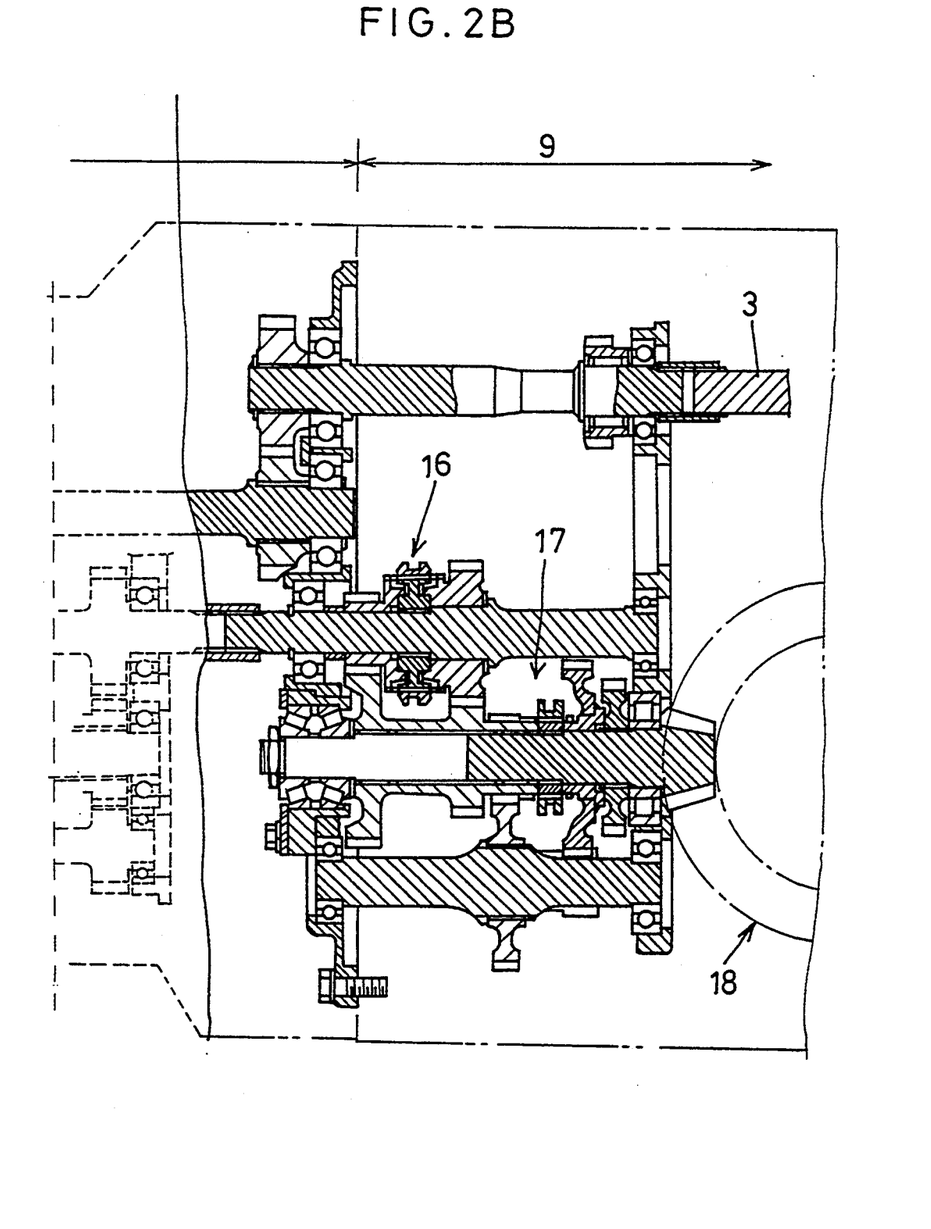
FIG. 2b is a view similar to that shown in FIG. 2a and showing the change speed gearing.

As shown in FIGS. 2A and 2B, the transmission case M has an interior divided broadly into three compartments 7, 8 and 9 in the fore and aft direction. The front compartment 7 houses a main change speed gearing 10 of a propelling system, a change speed gearing 11 of a PTO system, and a forward/backward changeover mechanism 12 of the PTO system. The intermediate compartment 8 houses a forward/backward changeover mechanism 13 of the propelling system, a hydraulically operable change speed clutch 14 for allowing operation of change speed mechanisms downstream of the forward/backward changeover mechanism 13, and a hydraulically operable PTO clutch 15. The rear compartment 9 houses an auxiliary change speed gearing 16 of the propelling system, a super-reduction mechanism 17, a differential 18 for receiving a final change speed output of the propelling system and driving the rear wheels 2, and rear axles 35 for supporting the rear wheels 2.

The transmission case M is directly coupled to a clutch case 19 disposed rearwardly of the engine E. The clutch case 19 houses a hydraulically operable main clutch C through which the power is transmitted to a main shaft 20 housed in the front compartment 7.

Figure 4:
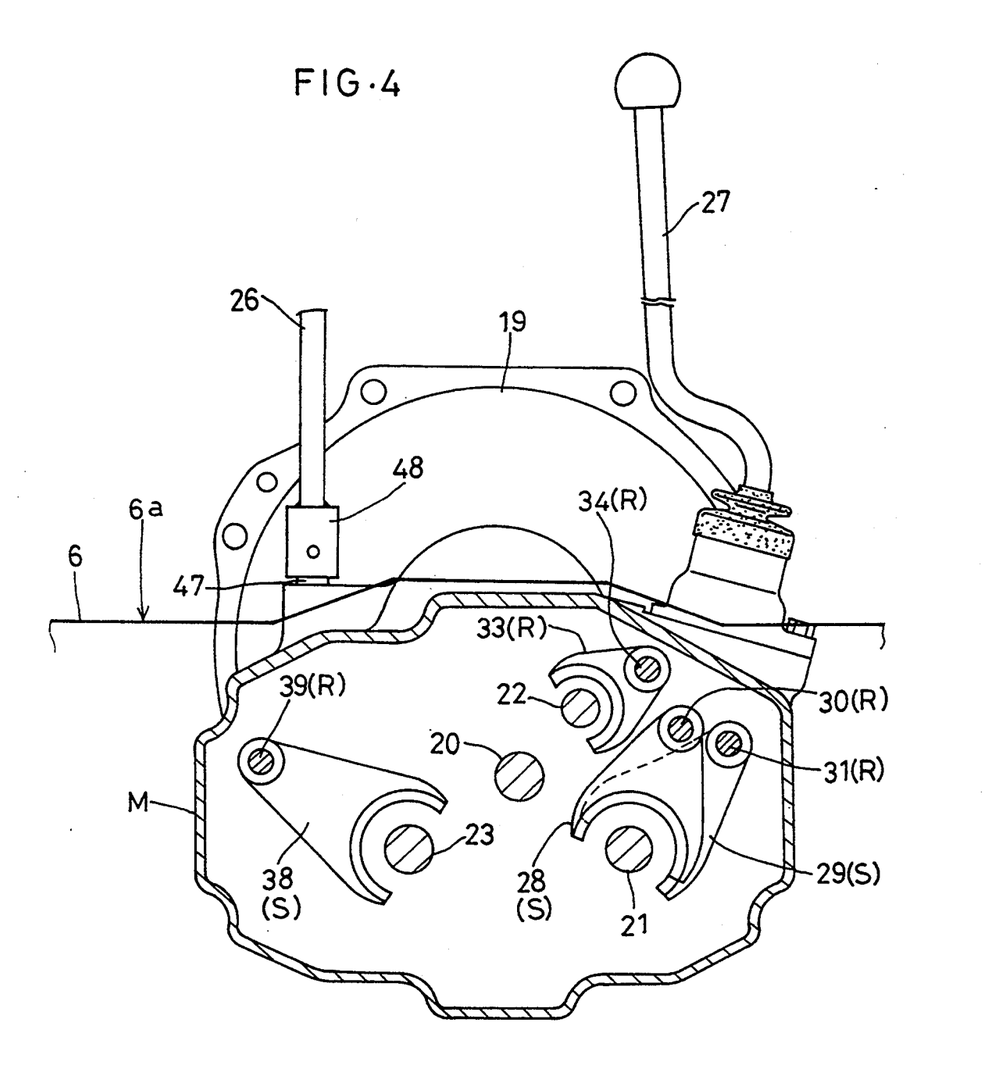
FIG. 4 is a cross section of a change speed control device for operating the transmission.

As shown in FIG. 4, a transmission shaft 21 of the PTO system and a reversing shaft 22 of the PTO system are arranged at a righthand side of the main shaft 20, while a transmission shaft 23 of the propelling system is disposed at a lefthand side of the main shaft 20. The main change speed gearing 10 is mounted on and between the main shaft 20 and the transmission shaft 23 of the propelling system. The change speed gearing 11 is mounted on and between the main shaft 20 and the transmission shaft 21 of the PTO system.

More particularly, the main shaft 20 carries a fourth gear G4, an intermediate gear G5, a third gear G3, a second gear G2 and a first gear G1 mounted in the stated order from front to back to be rotatable with the main shaft 20. The transmission shaft 23 of the propelling system carries a fourth speed gear G9, a third speed gear G8, a second speed gear G7 and a first speed gear G6 mounted in the stated order from front to back to be rotatable relative to the transmission shaft 23, respectively. The transmission shaft 21 of the PTO system carries a third speed gear G12, a fourth speed gear G13, a second speed gear G11 and a first gear G10 mounted in the stated order from front to back to be rotatable relative to the transmission shaft 21, respectively. The main change speed gearing 10 comprises a hydraulically operable synchromesh mechanism including two change speed elements 24. The change speed gearing 11 comprises a mechanically operable constant-mesh mechanism in which the fourth speed gear G13 and second speed gear G11 act as change speed elements.

The first, second and third gears G1–G3 on the main shaft 20 mesh with the first, second and third speed gears G6–G8 of the propelling system, and with the first, second and fourth speed gears G10, G11 and G13 of the PTO system, respectively. For reasons of change speed ratios, the fourth speed gear G9 of the propelling system and the third speed gear G12 of the PTO system mesh with the fourth gear G4 and intermediate gear G3 mounted on the main shaft 20, respectively. The reversing shaft 22 carries a reversing gear G14 slidably and relatively rotatably mounted thereon for meshing with the second gear G2. This constitutes the forward/backward changeover mechanism 12. A backward rotation state is provided by sliding the reversing gear G14 into mesh with both the second gear G2 and second speed gear G11.

Figure 3:
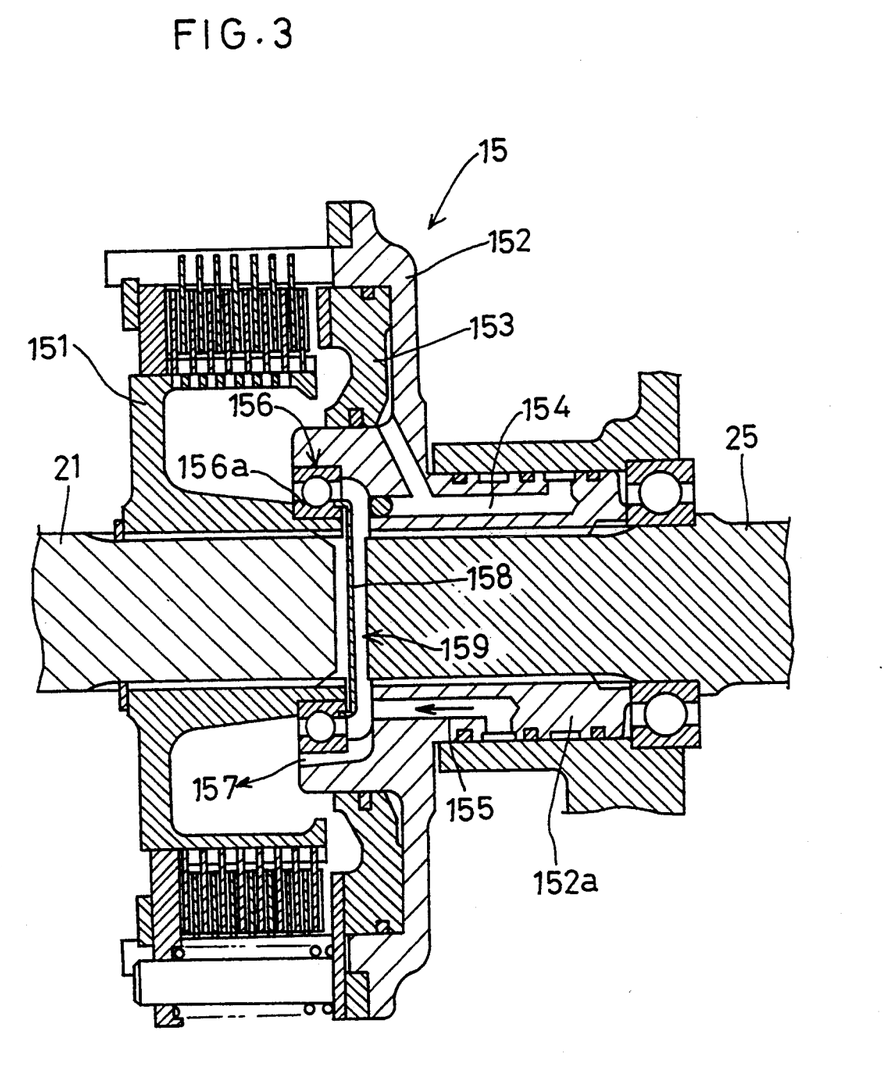
FIG. 3 is a side view in vertical section of a PTO clutch.

Referring to FIG. 3, the PTO clutch 15 comprises a wet type multidisk clutch including an inner body 151 splined to the transmission shaft 21, and an outer body 152 splined to an intermediate shaft 25. The outer body 152 includes a tubular shaft portion 152a defining a pressure oil passage 154 for pressing a clutch body 153 and an oil passage 155 for lubricating the clutch. Oil flows from the oil passage 155 into an oil sump 159 defined between the transmission shaft 21 and intermediate shaft 25, from which the oil is supplied through a bearing 156 into a clutch chamber 157. A circular seal 158 is attached to an inner ring 156a of the bearing 156 in order to prevent the oil from leaking through the spline connection between the inner body 151 and transmission shaft 21. The power output from the PTO clutch 15 is transmitted through the intermediate shaft 25 and PTO shaft 3 to a working implement not shown.

The forward/backward changeover mechanism 13 of the propelling system comprises a mechanically operable synchromesh mechanism. The forward/backward changeover mechanism 13 is manually controlled through a shuttle lever 26 which is laterally opposed, across the steering wheel 4, to a PTO change speed lever 27 for manually controlling the change speed gearing 11.

Figure 5:
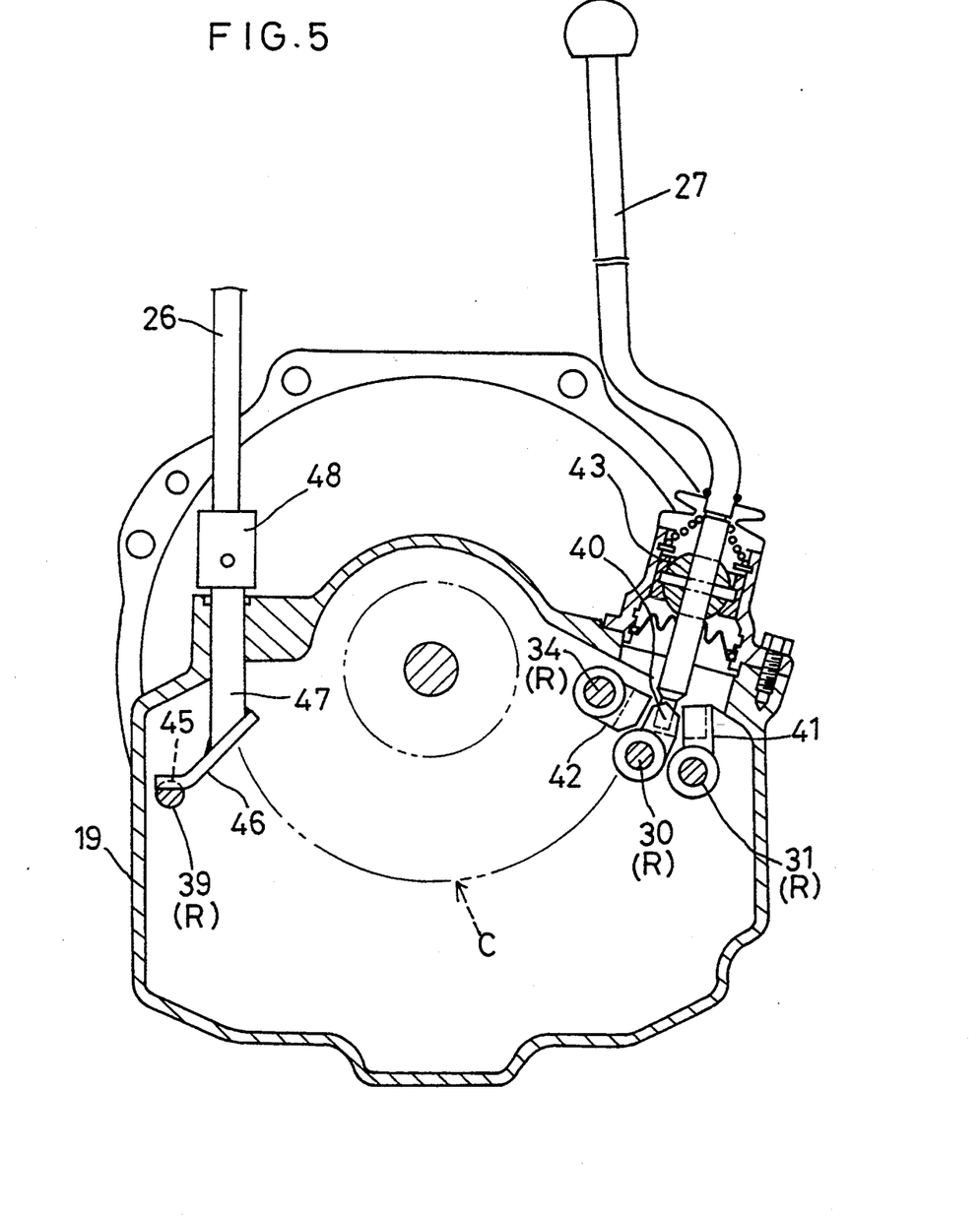
FIG. 5 is a cross section of a clutch case.
Figure 6:
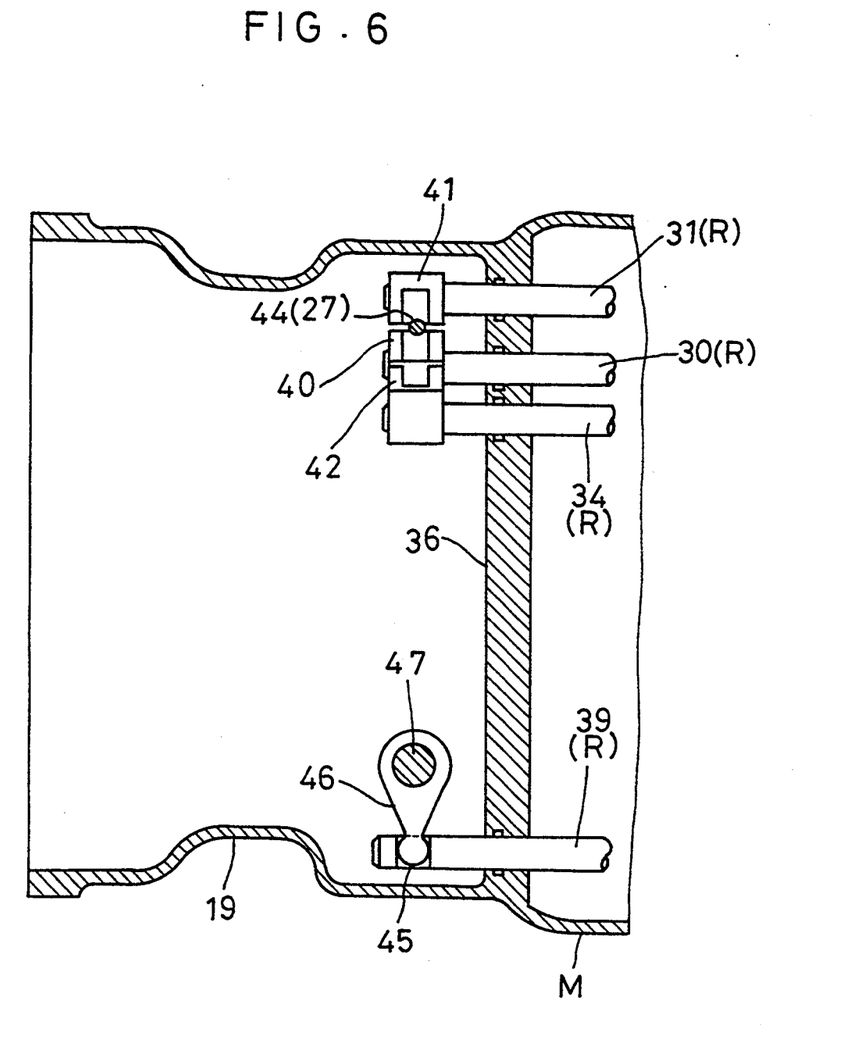
FIG. 6 is a view showing an arrangement of control rods.

As shown in FIGS. 4 through 6, the transmission case M houses a first rod 30, a second rod 31 and a third rod 34 extending in the fore and aft direction. The first rod 30 fixedly carries a first shifter 28 for sliding the second speed gear G11 of the change speed searing 11. The second rod 31 fixedly carries a second shifter 29 for sliding the fourth speed gear G13 of the change speed gearing 11. The third rod 34 fixedly carries a third shifter 33 for sliding the reversing gear G14 of the forward/backward changeover mechanism 12 of the PTO system. These rods 30, 31 and 34 extend into the clutch case 19 through a vertical wall 36 acting as a partition between the clutch case 19 and transmission case M.

A fourth rod 39 fixedly carries a fourth shifter 38 for operating a change speed element 37 of the forward-/backward changeover mechanism 13 of the propelling system. The fourth rod 39 also has a forward end thereof extending into the clutch case 19.

The first, second and third rods 30, 31 and 34 have respective engaging portions 40, 41 and 42 transversely juxtaposed close to one another adjacent a righthand end of the clutch case 19.

The clutch case 19 has an upper portion projecting above a flat portion 6a of the step board 6. The change speed lever 27 supported by a spherical bearing 43 extends upward from a top surface of the clutch case 19. The change speed lever 27 has a lower end thereof defining an engaging section 44 for operating the rods. This engaging section 44 is selectively engageable with the above-mentioned three engaging portions 40, 41 and 42 to provide the PTO system with four forward speeds and one backward speed.

The fourth rod 39 is disposed adjacent a lefthand end of the clutch case 19. The fourth rod 39 includes an engaging portion 45 engaging a control piece 46 oscillatable in the fore and aft direction by a support axis 47 extending upwardly through the top surface of the clutch case 19. The shuttle lever 26 is connected to the support axis 47 through a universal joint 48, and extend to a position at the left side of the steering wheel 4, with an extreme end thereof bent leftward.

Thus, the flat portion 6a of the step board 6 is free from proximal ends of the two levers 26 and 27. This provides for comfort of the driver.

It is emphasized here that, as shown in FIG. 2A, the step board 6 is located substantially over the front compartment 7 of the transmission case M which, as seen from FIG. 4, has a transversely large and vertically low sectional configuration. This allows the step board 6 to have a low upward bulge around its center.

The foregoing embodiment may be modified as follows:

The change speed lever 27 may be used to control the main change speed gearing 10. A change speed lever for controlling both the main change speed gearing 10 and change speed gearing 11 may be provided to extend upward from the top surface of the clutch case 19.

What is claimed is:

1. A transmission for a vehicle, comprising:
   an input main shaft mounted in a forward portion of said transmission case and extending in a fore and aft direction, said input main shaft having a first set of gears;
   a propelling transmission shaft disposed a predetermined distance below said input main shaft and on one side thereof, said propelling transmission shaft having a set of propelling change speed gears engageable with said first set of gears;
   a PTO transmission shaft also disposed a predetermined distance below and on an other side of said input main shaft opposite said propelling transmission shaft, said PTO transmission shaft having a set of PTO change speed gears also engageable with said first set of gears; and
   shifter control rods for selectively operating said set of propelling change speed gears and said set of PTO change speed gears, said shifter control rods extending in a fore and aft direction and being positioned above and diagonally with respect to said propelling transmission shaft and said PTO transmission shaft;
   wherein the offset positioning of said propelling transmission shaft and said PTO shaft with respect to said input main shaft results in said forward portion of said transmission case to have a transversely flat cross-sectional shape and a reduced vertical dimension.

2. The transmission as described in claim 1, further comprising a clutch case positioned intermediate a vehicle engine and said transmission case, said clutch case being partitioned from said transmission by a vertical wall.

3. The transmission as claimed in claim 2, further comprising a change speed lever extending upwardly from an upper surface of said clutch case for pushing and pulling said shifter control rods.

4. The transmission as claimed in claim 3 wherein said shifter control rods extending through said vertical wall into said clutch case have engaging portions transversely juxtaposed close to one another.

5. The transmission as claimed in claim 4 wherein said clutch case has a forward end facing said engine; and
   said shifter control rods engaging portions are adjacent said forward end of said clutch case.

* * * * *